United States Patent
Mochizuki

(10) Patent No.: US 9,606,857 B2
(45) Date of Patent: Mar. 28, 2017

(54) ELECTRONIC CONTROL UNIT

(71) Applicant: DENSO CORPORATION, Kariya, Aichi-pref. (JP)

(72) Inventor: Kenji Mochizuki, Chita-gun (JP)

(73) Assignee: DENSO CORPORATION, Kariya (JP)

(*) Notice: Subject to any disclaimer, the term of this patent is extended or adjusted under 35 U.S.C. 154(b) by 174 days.

(21) Appl. No.: 14/602,335

(22) Filed: Jan. 22, 2015

(65) Prior Publication Data
US 2015/0212874 A1 Jul. 30, 2015

(30) Foreign Application Priority Data

Jan. 24, 2014 (JP) .................................. 2014-11291

(51) Int. Cl.
G06F 11/00 (2006.01)
G06F 11/07 (2006.01)
H04L 1/00 (2006.01)

(52) U.S. Cl.
CPC ...... *G06F 11/0793* (2013.01); *G06F 11/0745* (2013.01); *H04L 1/0045* (2013.01)

(58) Field of Classification Search
CPC .. G06F 11/0793; G06F 11/0745; G06F 11/07; G06F 11/0703; G06F 11/0736; G06F 11/0751; G06F 11/0772; G06F 11/1443; G05B 23/02; G05B 23/0205; G05B 2219/15024; G05B 2219/1502; G05B 2219/15026; H04L 1/0045; H04L 1/0047; H04L 1/005; H04L 1/0051; H04L 5/24; H04L 25/245; H04L 25/38; H04L 25/40; H04L 7/00; H04L 7/0004; H04L 7/0075; H04L 7/10; H04L 7/0016; H04L 7/0033; H04L 7/0041; H04L 7/005; H04L 7/0054; H04L 7/0079; H04L 7/0083; H04L 7/0091

See application file for complete search history.

(56) References Cited

U.S. PATENT DOCUMENTS

| | | | |
|---|---|---|---|
| 5,790,603 A * | 8/1998 | Maeda | H04L 12/40013 375/316 |
| 7,400,672 B1 * | 7/2008 | Davis | H04L 1/0045 370/216 |
| 2011/0113277 A1 * | 5/2011 | Matsumoto | G06F 11/0724 713/375 |
| 2014/0153384 A1 | 6/2014 | Ishiyama | |

FOREIGN PATENT DOCUMENTS

JP 03-270334 A 12/1991

* cited by examiner

*Primary Examiner* — Michael Maskulinski
*Assistant Examiner* — Anthony J Amoroso
(74) *Attorney, Agent, or Firm* — Posz Law Group, PLC

(57) ABSTRACT

An electronic control unit includes first and second devices. A transmitter of the first device transmits data to a receiver of the second device by start-stop synchronization communication. On detecting a communication error, the second device transmits a communication stop signal to the first device, recovers the receiver, and transmits a restart signal to the first device when the receiver is recovered. Upon receipt of the communication stop signal, the first device stops the transmitter and initializes a transmission buffer, and commands the transmitter to restart transmitting the data upon receipt of the communication restart signal from the second device.

8 Claims, 5 Drawing Sheets

ELECTRONIC CONTROL UNIT

CROSS REFERENCE TO RELATED APPLICATION

The present application is based on Japanese Patent Application No. 2014-11291 filed on Jan. 24, 2014, disclosure of which is incorporated herein by reference

TECHNICAL FIELD

The present disclosure relates to an electronic control unit including multiple devices and performing communication processing between the devices.

BACKGROUND

An electronic control unit, such as a fuel injection controller for example, includes multiple devices such as a microcomputer and an IC for example, and performs communication processing between a first device and a second device to implement various operations. When the multiple devices carry out data communication by start-stop synchronization communication, a recovery process of recovering a receiver is performed in case of a parity error, a framing error, etc. In the recovery process for example, the receiver is placed in a reception-prohibited state and a reception buffer is initialized.

Patent Document 1: JP-3-270334A

Because the first device cannot recognize the timing of completing the recovery of the second device, there is a possibility that at a time of completing the recovery of the second device, a transmitter of the first device is in data transmission. In this case, the receiver of the second device may wrongly recognize that a bit in the middle of the data transmitted from the transmitter of the first device is a start bit. This is detected as a communication error. In this case, the second device may perform the recovery process once again, and repeat the recovery process again and again, and hang up.

For addressing this difficulty, a technology described in Patent Document 1 places a detector, which detects a character indicating a data beginning, in a waiting state, and prohibits a receiver from detecting an error and forwarding a received data to a memory until the detector completes a recovery process and detects a character indicating a beginning of next received data.

However, according to studies by the inventor of the present application, the above technology premises that a character indicating a beginning of a received data is added to a communication data. The above technology is not suitable for a start-stop synchronization communication, in which a start bit indicates a beginning of data. Moreover, a technology described in Patent Document 1 requires the character detection and thus requires, for example, dedicated hardware or software.

SUMMARY

It is an object of the present disclosure to provide an electronic control unit that can correctly continue communication processing in start-stop synchronization communication without repeating a receiver's recovery process again and again.

According to a first example of the present disclosure, an electronic control unit comprises a first device and a second device. The first device includes a transmission buffer for data and a transmitter transmitting the data of the transmission buffer by start-stop synchronization communication. The second device includes a receiver capable of receiving the data transmitted from the first device by the start-stop synchronization communication and detecting a communication error. The second device includes a communication stop signal transmission part that transmits a communication stop signal to the first device when the receiver detects the communication error, a recovery part that performs recovery processing on the receiver when the receiver detects the communication error, and a restart signal transmission part that transmits a restart signal to the first device when the receiver is recovered by the recovery part. The first device includes an stop-and-initialization part that stops the transmitter from transmitting the data and initializes the transmission buffer when the first device receives the communication stop signal from the communication stop signal transmission part of the second device, and a communication restart part that commands the transmitter to restart transmitting the data when the first device receives the communication restart signal from the restart signal transmission part of the second device.

According to the above electronic control unit, after the receiver of the second device is recovered normally, the transmitter of the first device can restart transmitting the data. Therefore, the receiver of the second device can normally receive the data transmitted from the transmitter of the first device. Accordingly, the receiver of the second device can continue communication processing normally, without repeating recovery processing again and again.

The above electronic control unit may be configured such that when stop of the transmitter by the stop-and-initialization part or initialization of the transmission buffer by the stop-and-initialization part is in progress at a time when the first device receives the communication restart signal from the restart signal transmission part of the second device, the communication restart part commands the transmitter to restart transmitting the data after the stop of the transmitter by the stop-and-initialization part and the initialization of the transmission buffer by the stop-and-initialization part are completed.

According to this configuration, without checking a state of the first device in advance, the second device can transmit the transmission restart signal using the restart signal transmission part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described below with reference to drawings. In embodiments, like references are used to refer to like parts and processes.

First Embodiment

Figure 1:
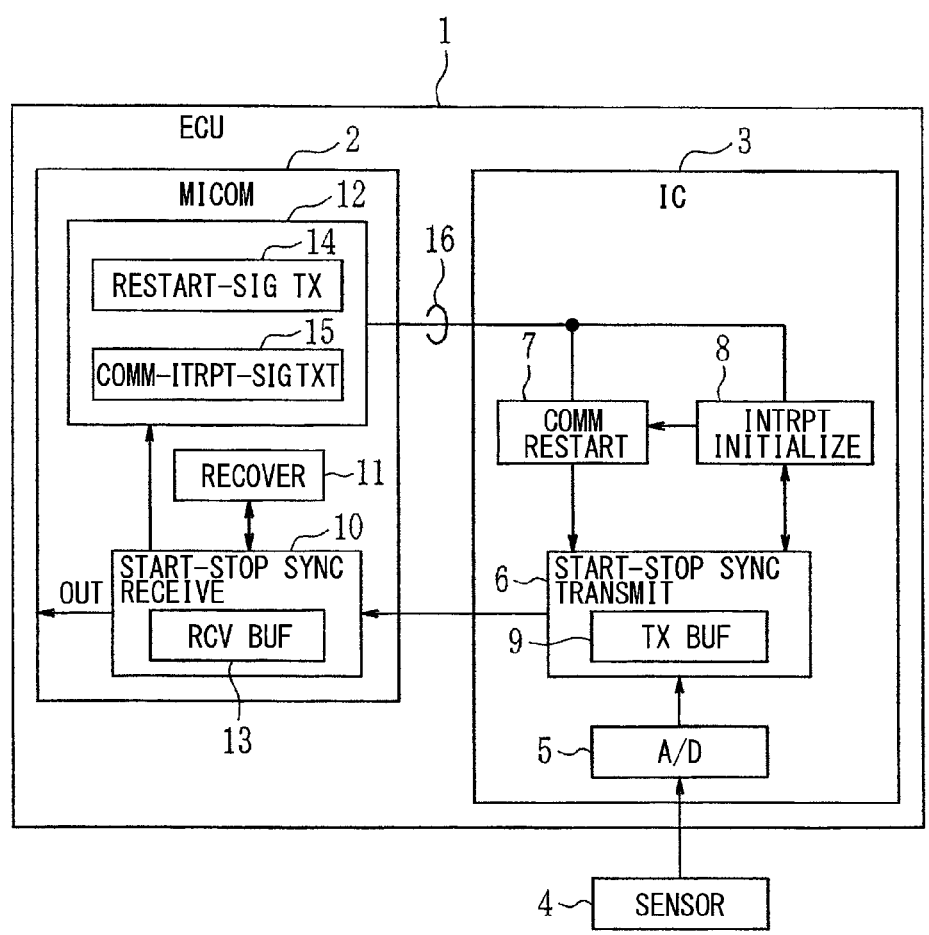
FIG. 1 is a functional block diagram schematically illustrating an internal electric configuration of an electronic control unit of a first embodiment.

FIG. 1 to FIG. 4 illustrate a first embodiment. FIG. 1 is a block diagram schematically illustrating an electric configuration in an electronic control unit (ECU) 1. The ECU 1 includes a microcomputer 2 and a custom-made integrated circuit (IC) 3. For example, the ECU 1 drives various kinds of externally-connected sensors 4 and receives a sensor signal from the sensor 4. The sensors 4 include, for example, but not limited to, an A/F sensor etc.

The sensor signal of the sensor 4 is provided to the IC 3. The IC 3 includes hardware equipped with functions of an A/D converter 5, a start-stop synchronization transmitter 6 (also called hereinafter a transmitter), a communication restart part 7, and an stop-and-initialization part 8. The transmitter 6 includes a transmission buffer 9, which holds transmission data temporarily.

The sensor signal of the sensor 4 is provided to the microcomputer 2 from the transmitter 6 in the IC 3. The microcomputer 2 includes functions of a start-stop synchronization receiver 10 (also referred to hereinafter as a receiver), a recovery part 11, and a transmitter 12. These functions may be implemented by hardware or software. The receiver 10 includes a reception buffer 13, which accumulates received data temporarily.

The transmitter 12 includes functions of a restart signal transmission part 14 and a communication stop signal transmission part 15. These functions may be implemented by hardware or software. The transmitter 12 in the microcomputer 2 is connected to the IC 3 by, for example, a single wire 16. The communication stop signal transmission part 15 is equipped with a function of transmitting a communication stop signal to the IC 3. The restart signal transmission part 14 includes a function of transmitting a communication restart signal to the IC 3.

The communication stop signal transmission part 15 is configured to transmit a rising edge through the single wire 16 as the communication stop signal. The restart signal transmission part 14 is configured to transmit a falling edge to the IC 3 through the single wire 16 as the communication restart signal. These configurations regarding the rising edge and the falling edge may be reversed. For example, the rising edge may be used as the communication restart signal, and the falling edge may be used the communication stop signal. In these ways, the communication stop signal and the communication restart signal can be transmitted using only the single wire 16.

When the communication stop signal transmission part 15 of the microcomputer 2 provides the IC 3 with the communication stop signal, the stop-and-initialization part 8 of the IC 3 provides the transmitter 6 with a command signal which commands the transmitter 6 to stop communication processing and initialize the transmission buffer 9. When the initialization of the transmission buffer 9 is completed, the transmitter 6 transmits a completion signal to the stop-and-initialization part 8. In this case, the stop-and-initialization part 8 transmits an initialization completion signal, which indicates the completion of the initialization, to the communication restart part 7.

Upon receipt of the initialization completion signal, the communication restart part 7 of the IC 3 provides the transmitter 6 with a command signal commanding the transmitter 6 to restart the communication processing, provided that the communication restart signal is provided to the IC 3 from the restart signal transmission part 14 of the microcomputer 2.

Figure 2:
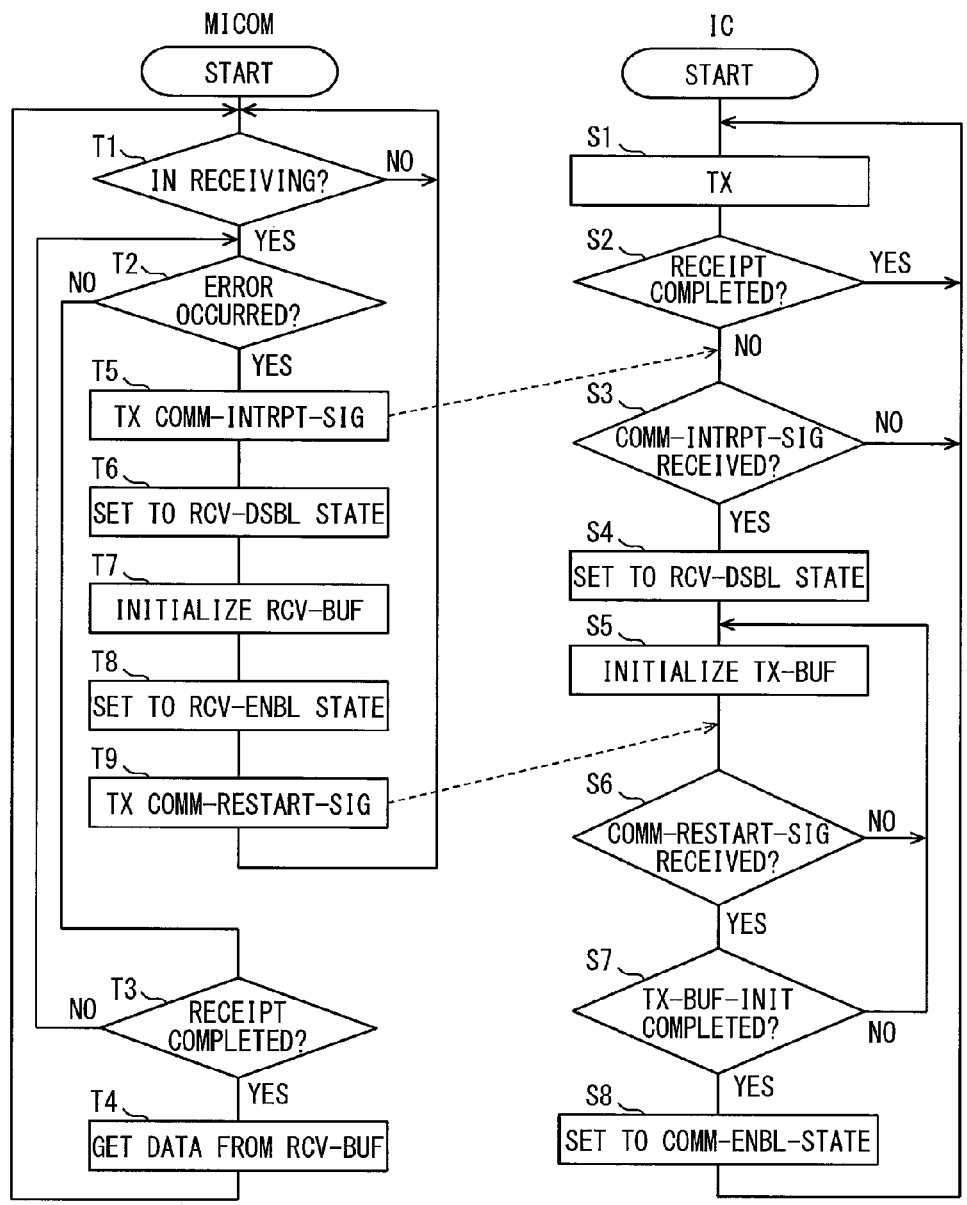
FIG. 2 is a flowchart schematically illustrating processes.
Figure 3:
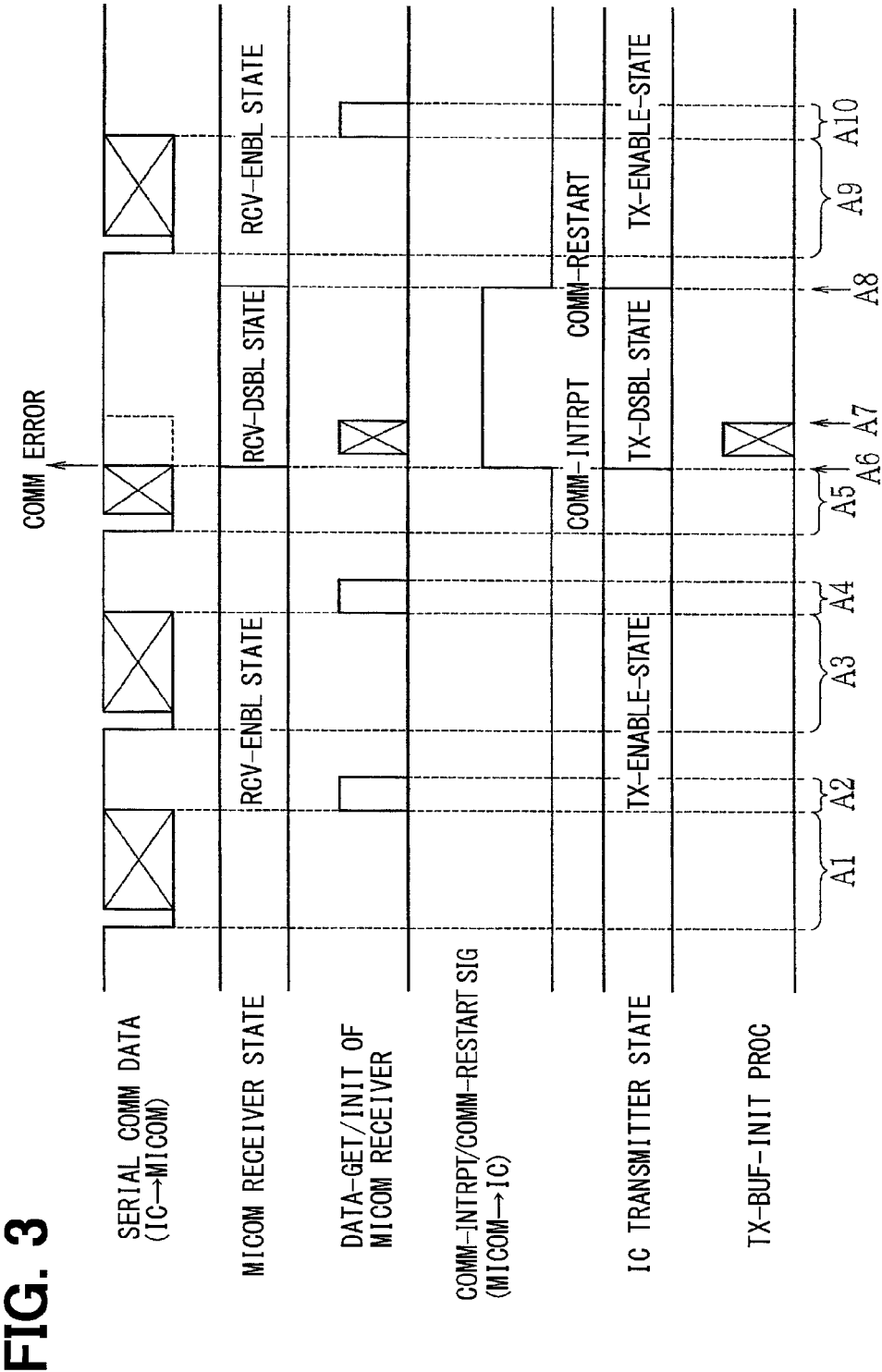
FIG. 3 is a first timing chart schematically illustrating processes.
Figure 4:
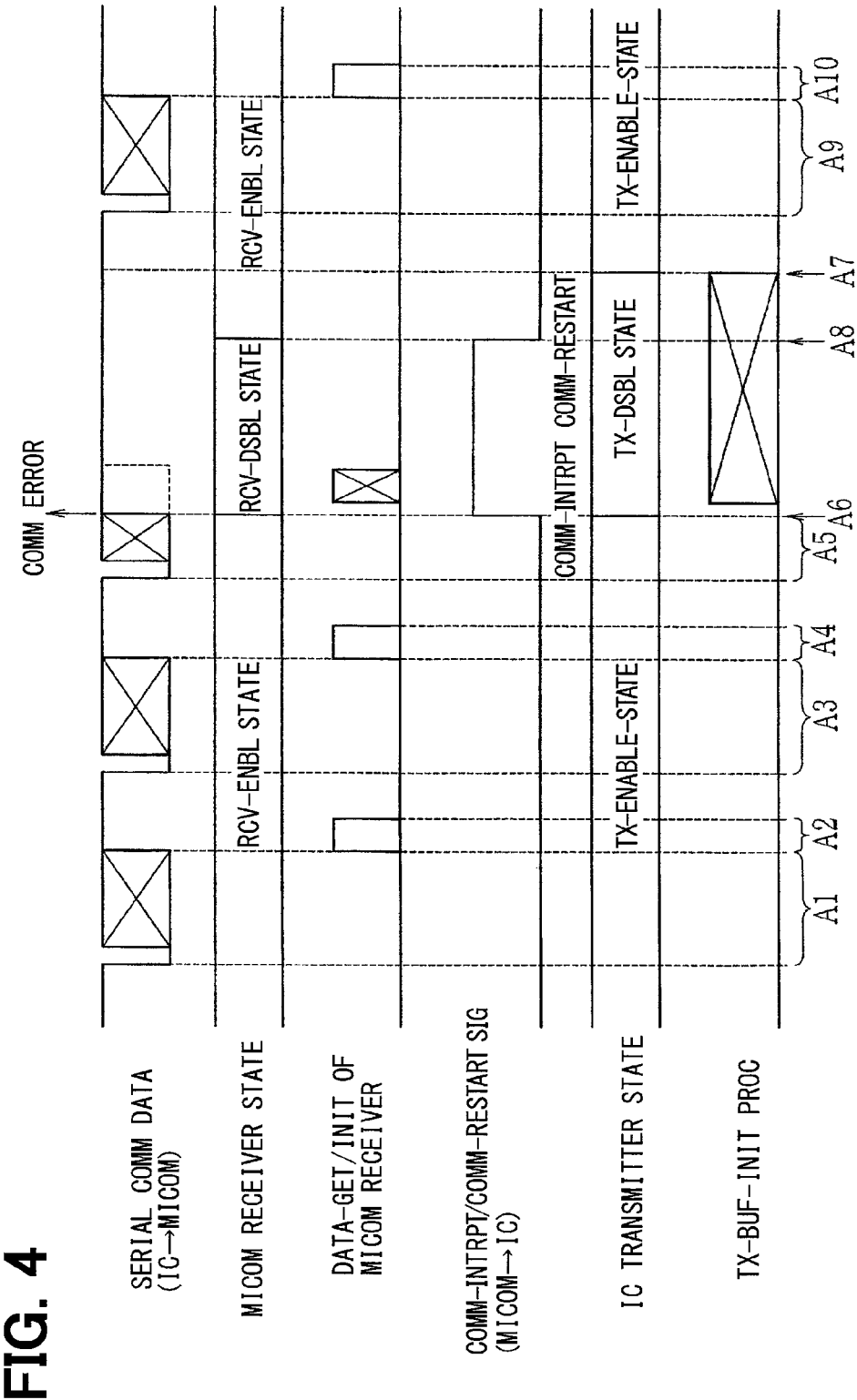
FIG. 4 is a second timing chart schematically illustrating processes.

Operations will be specifically described. FIG. 2 is a flowchart schematically illustrating processes of the microcomputer 2 and the IC 3. FIGS. 3 and 4 are timing charts schematically illustrating processes of the microcomputer 2 and the IC 3.

First, the sensor 4 transmits a sensor signal to the A/D converter 5 of the IC 3. The A/D converter 5 carries out A/D conversion (analog to digital conversion) on this sensor signal to provide digital data, and accumulates the digital data in the transmission buffer 9 in the IC 3.

In the IC 3, the transmitter 6 transmits transmission data in the transmission buffer 9 to the microcomputer 2 by start-stop synchronization communication, as shown in S1 of FIG. 2, and A1 of FIGS. 3, 4. Specifically, the transmitter 6 transmits a start bit, a communication data for 1 block (communications data of 1 block size), and a stop bit to the microcomputer 2. The IC 3 continues making a determination of whether or not the transmission by the transmitter 6 is completed (S2 of FIG. 2) and making a determination of whether or not the communication stop signal is received by the stop-and-initialization part 8 (S3 of FIG. 2).

In the microcomputer 2, while the receiver 10 is receiving data from the transmitter 6 of the IC 3 (YES at T1 of FIG. 2), the receiver 10 continues receiving the data while determining whether or not a communication error occurs (NO at T2, NO at T3 of FIG. 2). When the receiver 10 has no communication error while receiving the data, the receiver 10 completes the receipt of the data (YES at T3 of FIG. 2) and the microcomputer 2 acquires the data accumulated in the reception buffer 13 (T4 of FIG. 3 and A2 of FIG. 3).

In the IC 3, when the transmitter 6 completes the transmitting processing (YES at S2 of FIG. 2) without receipt of the communication stop signal with the stop-and-initialization part 8 (NO at S3 of FIG. 2), the normal data communication processing is finished normally. Thereafter, when the sensor signal of the sensor 4 is accumulated in the transmission buffer 9 as the data through the A/D converter 5, the IC 3 and the microcomputer 2 repeat processes from S1 and T1 again, respectively (see A3 and A4 of FIG. 3 and FIG. 4).

The above processes are repeated successively. Now, explanation will be given on processes when a communication error occurs for some reasons (e.g., some influences). For example, when the transmitter 6 of the IC 3 is transmitting the data stored in the transmission buffer 9 to the receiver 10 of the microcomputer 2, a communication error may occur for some reasons. In this case, the receiver 10 of the microcomputer 2 determines that the error has occurred (YES at T2 of FIG. 2). In the microcomputer 2, the receiver 10 outputs the stop command to the transmitter 12 and a recovery command to the recovery part 11. In the microcomputer 2, the communication stop signal transmission part 15 of the transmitter 12 transmits a communication stop signal to the IC 3 (T5 of FIG. 2). In the microcomputer 2, the recovery part 11 performs initialization processing. For example, the recovery part 11 performs recovery processing for placing the reception buffer 13 in a receivable-state (reception-enabled state), such as initializing the reception buffer 13 or the like. The recovery processing may include one or various processes such as a power restart (e.g., power off and on) process, a reset process or the like.

In the IC 3, when the stop-and-initialization part 8 determines that the communication stop signal is received (YES at S3 of FIG. 2), the stop-and-initialization part 8 sets the transmission-disabled state (S4 of FIG. 2). Subsequently, the stop-and-initialization part 8 initializes (e.g., clears) the transmission buffer 9 (S5 of FIG. 2). For example, the stop-and-initialization part 8 discards the 1-block transmission data that is being transmitted to the microcomputer 2. In this case, the IC 3 waits until the communication restart part 7 receives the communication restart signal (No at S6 of FIG. 2).

In the microcomputer 2, when the communication stop signal transmission part 15 transmits the communication stop signal at T5, the receiver 10 is placed in a reception-processing-disabled state (T6 of FIG. 2) and the reception buffer 13 is initialized by the recovery part 11 (T7 of FIG. 2). Specifically, the receiver 10 discards a group of receive data received from the IC 3. Thereafter, the microcomputer 2 places the receiver 10 in a reception-processing-enabled state (T8 of FIG. 2), and the restart signal transmission part 14 transmits the communication restart signal (T9 of FIG. 2).

Processes of the IC 3 vary depending on whether or not the initialization of the transmission buffer 9 is completed at a time when the communication restart part 7 receives the communication restart signal. This variation in process will be described with reference to FIGS. 3 and 4.

<FIG. 3 Case>

FIG. 3 illustrates a case where the transmission buffer 9 has been initialized at a time of receipt of the communication restart signal. When the restart signal transmission part 14 of the microcomputer 2 transmits the communication restart signal to the IC 3, the communication restart part 7 of the IC 3 receives this communication restart signal (YES at S6 of FIG. 2).

When the transmission buffer 9 of the IC 3 is initialized (YES at S7 of FIG. 2 and A7 of FIG. 3), the transmitter 6 transmits a completion signal to the stop-and-initialization part 8 and the stop-and-initialization part 8 transmits the initialization completion signal indicating the completion of the initialization to the communication restart part 7.

In the IC 3, when the transmission buffer 9 has been initialized at a time of receipt of the communication restart signal, the communication restart part 7 immediately transmits the communication restart signal to the transmitter 6 to command the transmission, thereby placing the transmitter 6 in a communicable state (S8 of FIG. 2, A8 of FIG. 3). Thereafter, the IC 3 returns to S1 of FIG. 2 to repeat the processes. Because of this, it becomes possible to normally continue the data transmitting processing of transmitting the data from the IC 3 to the microcomputer 2.

<FIG. 4 Case>

FIG. 4 illustrates a case where the transmission buffer 9 has not been initialized at a time of receipt of the communication restart signal. The restart signal transmission part 14 of the microcomputer 2 transmits the communication restart signal to the IC 3 and the communication restart part 7 of the IC 3 receives this communication restart signal (YES at S6 of FIG. 2). In this case, when the initialization of the transmission buffer 9 is not completed at a time when the communication restart part 7 receives the communication restart signal (NO at S7 of FIG. 2, A8 of FIG. 4), S5 to S7 are repeated until the transmission buffer 9 is initialized. In the IC 3, when the initialization of the transmission buffer 9 is completed (YES at S7 of FIG. 2, A7 of FIG. 4), the transmitter 6 transmits a completion signal to the stop-and-initialization part 8 and the stop-and-initialization part 8 transmits an initialization completion signal indicating the completion of the initialization to the communication restart part 7.

Upon receipt of the initialization completion signal from the stop-and-initialization part 8, the communication restart part 7 transmits the communication restart signal to the transmitter 6 to thereby place the transmitter 6 in a communicable state (S8 of FIG. 2). Then the IC 3 returns to S1 of FIG. 2 to repeat the processing. Because of this, it becomes possible to normally continue the data transmitting processing of transmitting the data from the IC 3 to the microcomputer 2 (A9 and A10 of FIG. 4).

<Outline>

In the present embodiment, when the stop-and-initialization part 8 of the IC 3 receives the communication stop signal from the communication stop signal transmission part 15 of the microcomputer 2, the stop-and-initialization part 8 stops the transmission processing of the transmitter 6 and initializes the transmission buffer 9. When the communication restart part 7 receives the communication restart signal from the restart signal transmission part 14, the communication restart part 7 commands the transmitter 6 to restart the data transmission processing.

Therefore, after the receiver 10 of the microcomputer 2 is recovered normally, the transmitter 6 of the IC 3 can restart the data transmission processing. Accordingly, the receiver 10 inside the microcomputer 2 can normally receive the data transmitted from the transmitter 6 of the IC 3. Therefore, the receiver 10 can normally continue the communication processing without repeating the recovery processing again and again. The hang up of the receiver 10 is prevented.

In the IC 3, when the stop processing by the stop-and-initialization part 8 or the initialization processing of initializing the transmission buffer 9 by the stop-and-initialization part 8 is in progress at a time when the IC 3 receives the communication restart signal, the communication restart part 7 commands the transmitter 6 to restart to transmitting the data after the stop processing by the stop-and-initialization part 8 or the initialization processing of initializing the transmission buffer 9 by the stop-and-initialization part 8 is completed. Therefore, without checking the state of the IC 3 in advance, the microcomputer 2 can transmit a transmission restart signal to the IC 3 from the restart signal transmission part 14.

Moreover, because the communication restart signal and the communication stop signal can be transmitted via the single wire 16 when the transmitter 12 of the microcomputer 2 is connected to the IC 3 by the single wire 16, the total number of terminals required for the transmission reception processing between the microcomputer 2 and the IC 3 can be reduced as small as possible.

Second Embodiment

Figure 5:
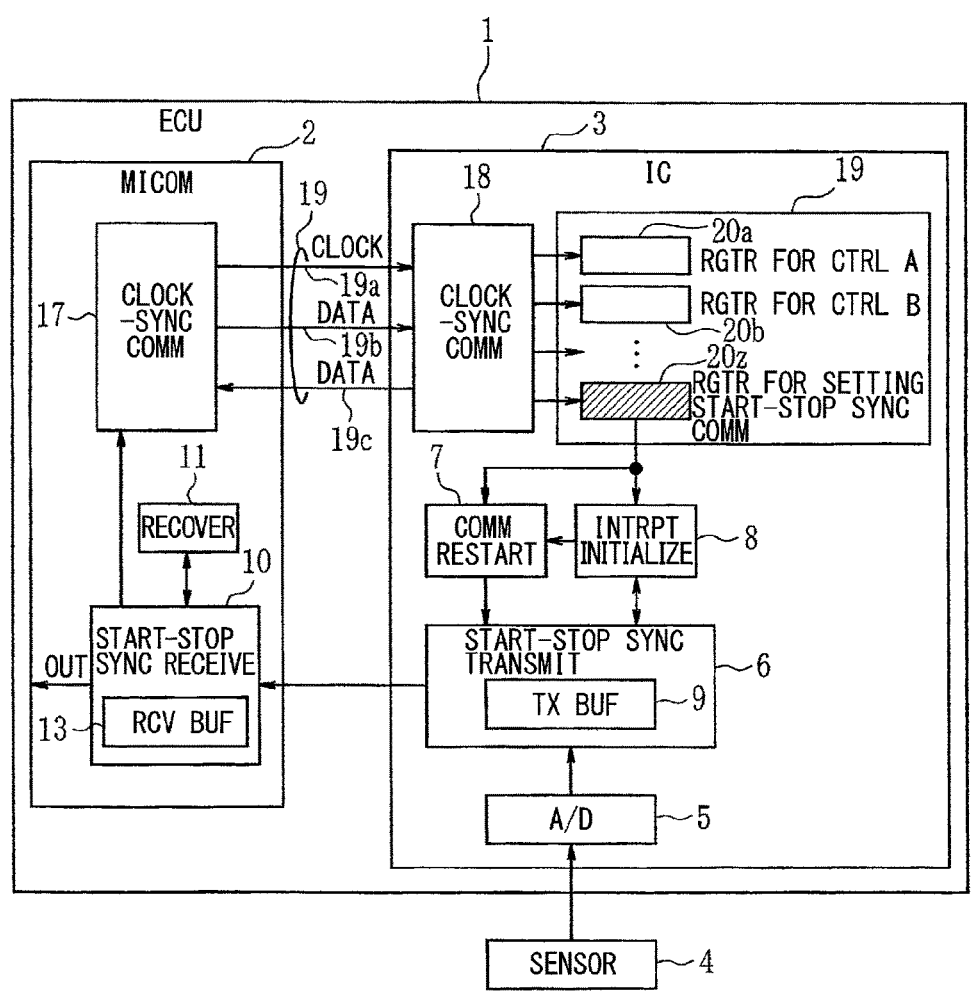
FIG. 5 is a functional block diagram schematically illustrating an internal electric configuration of an electronic control unit of a second embodiment.

FIG. 5 illustrates a second embodiment. Differences between the first and second embodiments include transmitting and receiving a communication stop signal and/or a communication restart signal via a clock synchronization communication wire. Between the first and second embodiments, like references are used to refer to like parts and processes.

As shown in FIG. 5, the microcomputer 2 includes a clock synchronization communication part 17 (also called hereinafter a communication part) in place of the transmitter 12 illustrated in FIG. 1. The IC 3 also includes a clock synchronization communication part 18 (also called hereinafter a communication part). A clock synchronization communication wire 19 connects between these communication parts 17 and 18. The clock synchronization communication wire 19 includes a clock wire 19a, a data wire 19b for data from the microcomputer 2 to the IC 3, and a data wire 19c for data from the IC 3 to the microcomputer 2.

The communication part 18 is connected to a group of registers 20. The registers 20 include an internal control registers 20a, 20b . . . for the IC 3 to perform various operations. The microcomputer 2 can set the control registers 20a, 20b to values through the communication parts 17, 18

The group of registers 20 includes a register 20z for setting stop and restart of the start-stop synchronization communication. The microcomputer 2 can set the register 20z to the stop and the restart through the communication parts 17, 18.

For example, when the microcomputer 2 and the IC 3 perform clock synchronization communication processing with the communication parts 17 and 18 and the stop is written in the register 20z by the microcomputer 2, the stop-and-initialization part 8 reads the value of this register 20z, and gives an stop-and-initialization command to the transmitter 6, thereby performing the stop processing and the initialization processing. When the restart is written in the register 20z by the microcomputer 2, the stop-and-initialization part 8 reads the value of this register 20z, and gives a transmission restart command to the transmitter 6. Other processes are substantially the same as those in the first embodiment.

In the present embodiment, the microcomputer 2 can transmit the communication stop signal and/or the communication restart signal through the clock synchronization communication wire 19. In the present embodiment, because the clock synchronization communication wire 19 is used for, for example, setting various control registers 20a, 20b . . . , the register 20z can be set by shared use of the clock synchronization communication wire 19. Accordingly, a dedicated wire for transmitting the communication stop signal and/or the communication restart signal becomes unnecessary. External connection pins of the microcomputer 2 and the IC 3 can be reduced.

Other Embodiments

The above-illustrated embodiments cannot limit embodiments of the present disclosure and can be extended, modified and combined in various ways. For example, the clock synchronization communication wire 19 illustrated in the second embodiment may be provided as a wire dedicated for transmission and receipt of the communication stop signal and/or the communication restart signal.

What is claimed is:

1. An electronic control unit comprising:
a first device that includes a transmission buffer for data and a transmitter transmitting the data of the transmission buffer by start-stop synchronization communication; and
a second device that includes a receiver capable of receiving the data transmitted from the first device by the start-stop synchronization communication and detecting a communication error,
the second device including:
a communication stop signal transmission part that transmits a communication stop signal to the first device when the receiver detects the communication error;
a recovery part that performs recovery processing of recovering the receiver when the receiver detects the communication error; and
a restart signal transmission part that transmits a restart signal to the first device when the receiver is recovered by the recovery part,
the first device including:
a stop-and-initialization part that stops the transmitter from transmitting the data and initializes the transmission buffer when the first device receives the communication stop signal from the communication stop signal transmission part of the second device; and
a communication restart part that commands the transmitter to restart transmitting the data when the first device receives the communication restart signal from the restart signal transmission part of the second device.

2. The electronic control unit according to claim 1, wherein:
when stop of the transmitter by the stop-and-initialization part or initialization of the transmission buffer by the stop-and-initialization part is in progress at a time when the first device receives the communication restart signal from the restart signal transmission part of the second device, the communication restart part commands the transmitter to restart transmitting the data after the stop of the transmitter by the stop-and-initialization part and the initialization the transmission buffer by the stop-and-initialization part are completed.

3. The electronic control unit according to claim 1, wherein:
each of the first device and the second device includes a clock synchronization communication part; and
the clock synchronization communication part of the second device functions as the communication stop signal transmission part and transmits the communication stop signal to the clock synchronization communication part of the first device by clock synchronization communication.

4. The electronic control unit according to claim 3, further comprising
a clock synchronization communication wire between the first device and the second device, the clock synchronization communication wire being used to set a register,
wherein:
the clock synchronization communication part of the second device transmits the communication stop signal to the first device via the clock synchronization communication wire.

5. The electronic control unit according to claim 1, wherein:
each of the first device and the second device includes a clock synchronization communication part; and
the clock synchronization communication part of the second device functions as the restart signal transmission part and transmits the restart signal to the clock synchronization communication part of the first device by clock synchronization communication.

6. The electronic control unit according to claim 5, further comprising
a clock synchronization communication wire between the first device and the second device, the clock synchronization communication wire being used to set a register,
wherein:

the clock synchronization communication part of the second device transmits the restart signal to the first device via the clock synchronization communication wire.

7. The electronic control unit according to claim 1, further comprising
a single wire connecting between the first device and the second device,
wherein:
via the single wire, the communication stop signal transmission part transmits one of a rising edge and a falling edge as the communication stop signal; and
via the single wire, the restart signal transmission part transmits the other of the rising edge and the falling edge as the restart signal.

8. The electronic control unit according to claim 1, wherein:
the communication error to be detected includes a parity error and a framing error in the start-stop synchronization communication; and
when the receiver of the second device detects the communication error while receiving the data including a start bit indicative of beginning of the data, a communication data of one block size and a stop bit from the first device by the start-stop synchronization communication, the communication stop signal transmission part of the second device transmits the communication stop signal to the first device and the transmitter of the first device discards the communication data of one block size and stops transmitting the data that is being transmitted to the first device by the start-stop synchronization communication.

* * * * *